March 8, 1966 D. V. RICHARDSON 3,238,768
JET ENGINE ANALYZER
Filed Feb. 19, 1963 4 Sheets-Sheet 1

INVENTOR.
DONALD V. RICHARDSON
BY
Shenier & O'Connor
ATTORNEYS

March 8, 1966 — D. V. RICHARDSON — 3,238,768
JET ENGINE ANALYZER
Filed Feb. 19, 1963 — 4 Sheets-Sheet 2
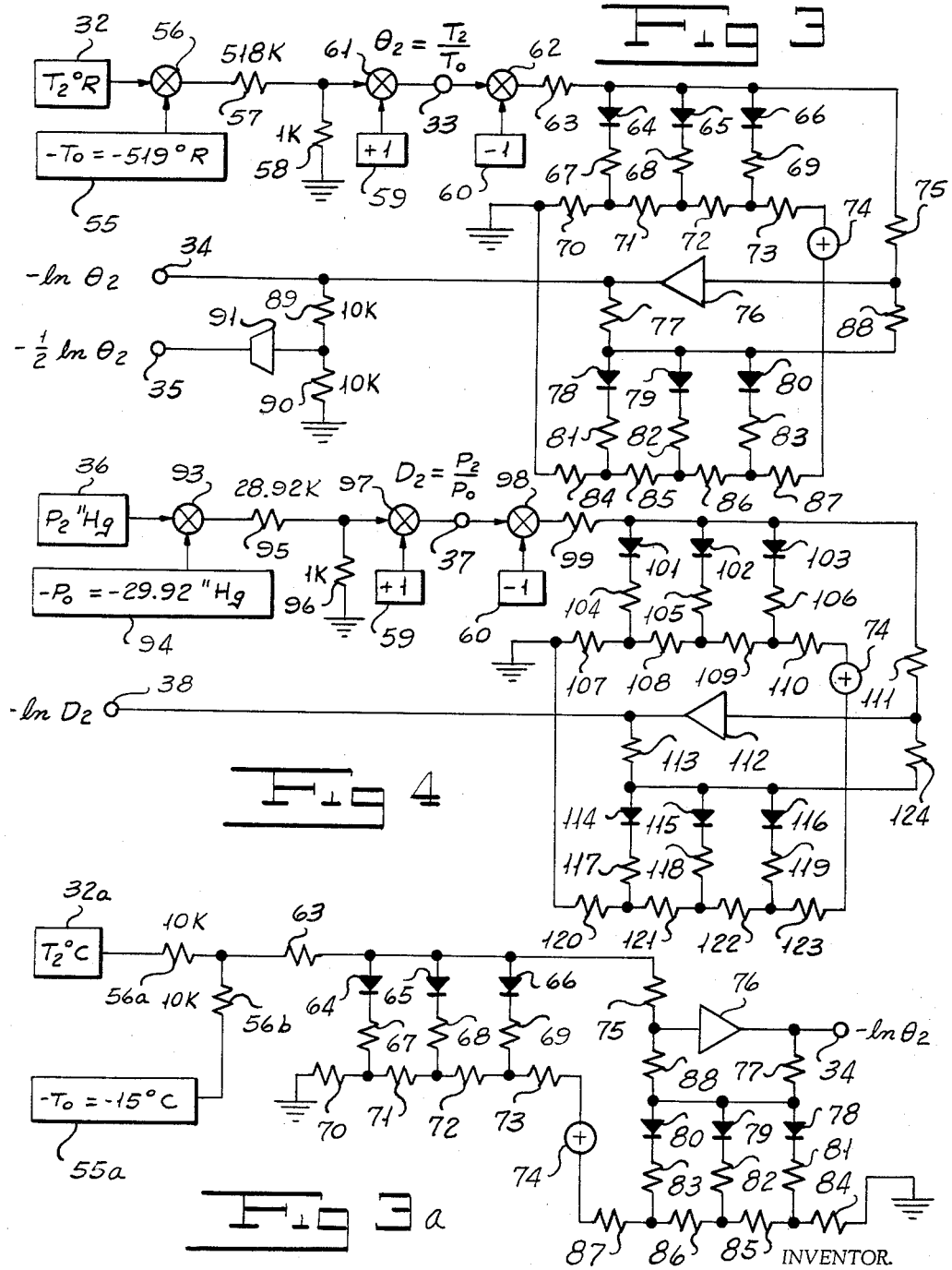
INVENTOR.
DONALD V. RICHARDSON
BY
Shenier & O'Connor
ATTORNEYS

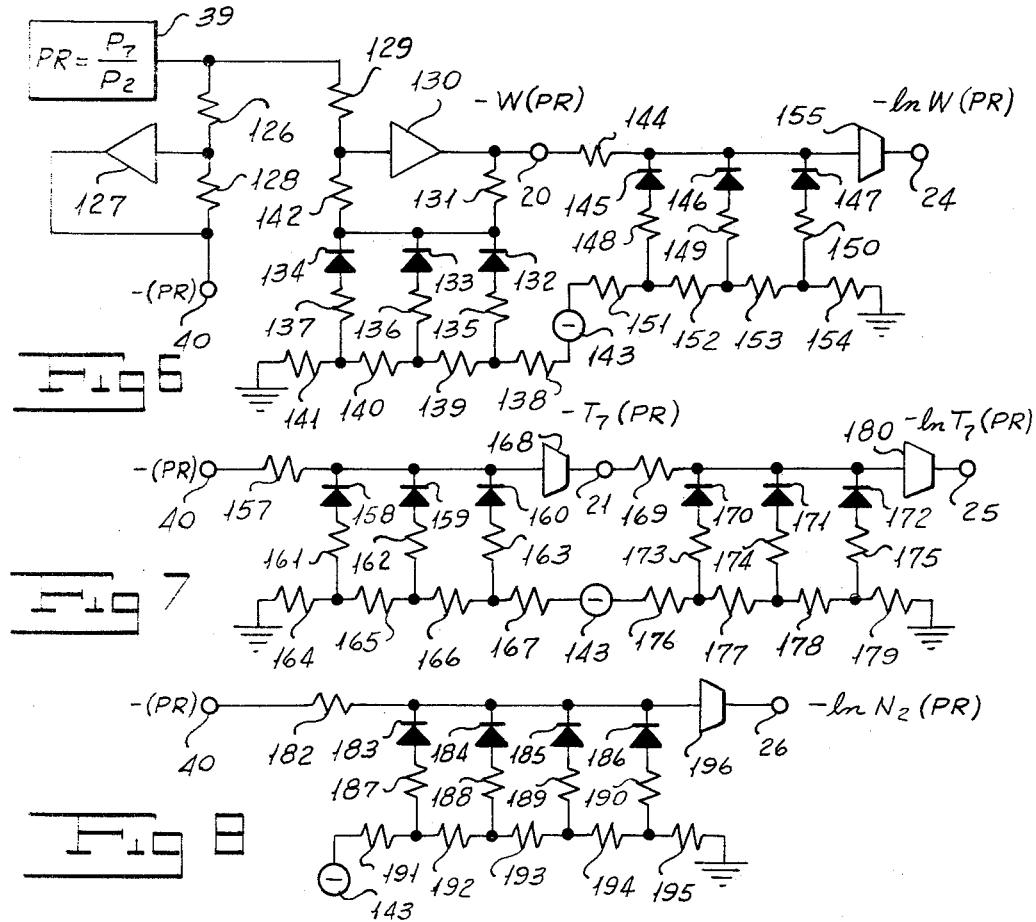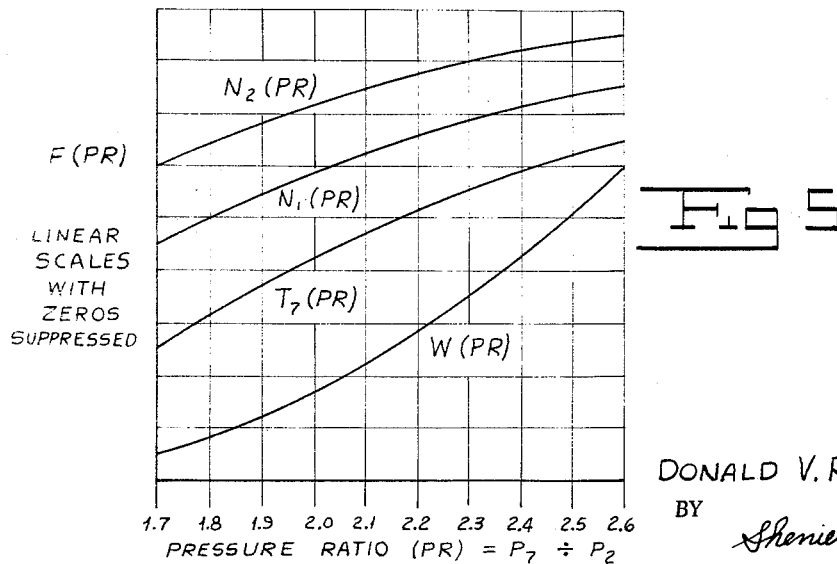

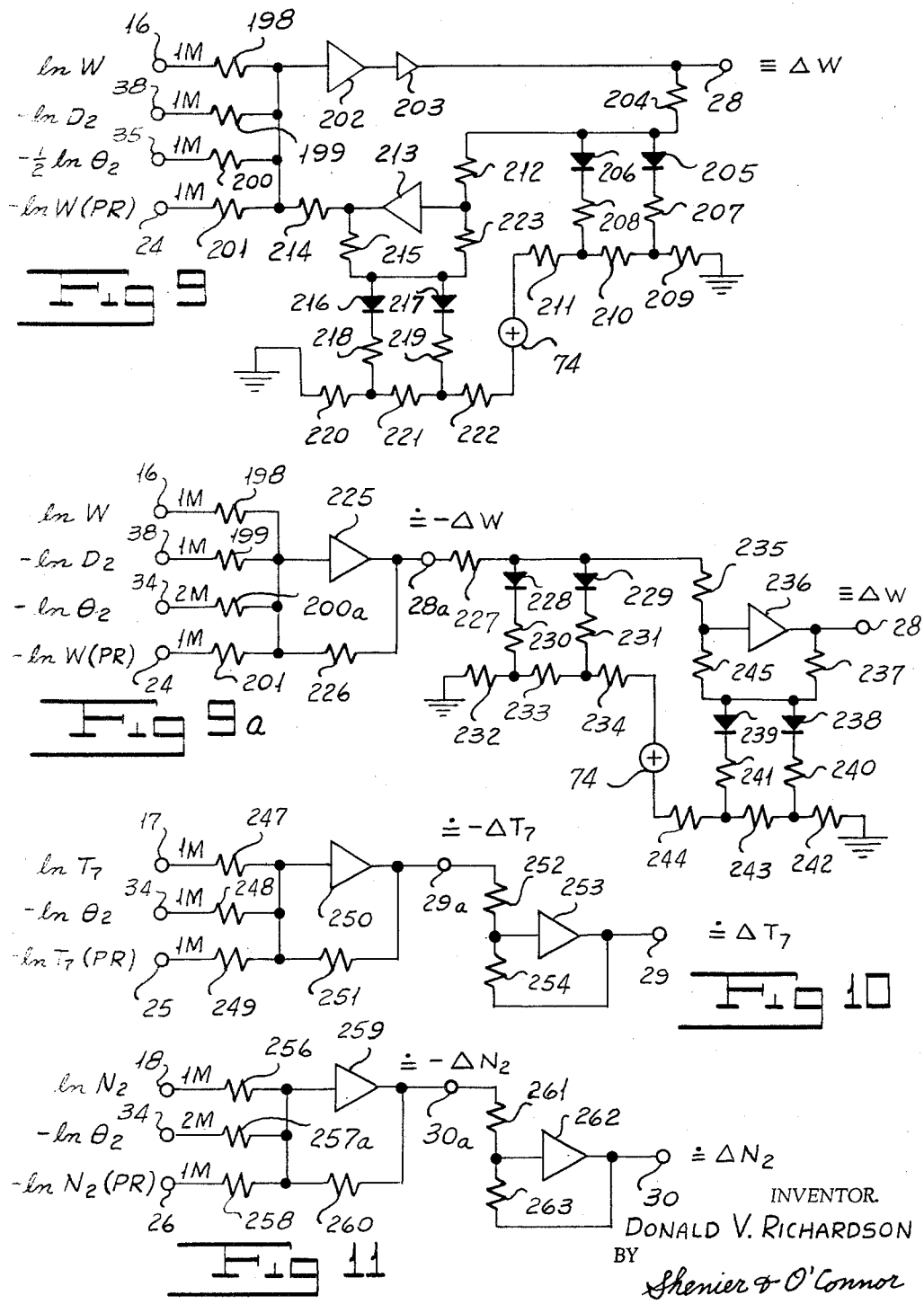

United States Patent Office 3,238,768
Patented Mar. 8, 1966

3,238,768
JET ENGINE ANALYZER
Donald V. Richardson, Stratford, Conn., assignor to
United Aircraft Corporation, East Hartford, Conn., a
corporation of Delaware
Filed Feb. 19, 1963, Ser. No. 259,496
29 Claims. (Cl. 73—116)

My invention relates to a jet engine analyzer and more particularly to an air borne monitoring system for gas turbine jet engines. There are many possible causes for degradation in the performance of a jet engine. In any heat engine loss of thermodynamic performance will be due to inefficient compresion, inefficient combustion or inefficient expansion. The useful output of a jet engine appears as a rise in pressure between the outlet of the intake diffuser and the inlet of the exhaust nozzle. If the two pressures were equal then the engine would produce no pressure rise and provide no thrust. The ratio of the two pressures may be defined as the engine pressure ratio (PR). The thrust of a jet engine is a function of the engine pressure ratio. In a jet engine inefficient compression may be caused by damage to or failure of one or more compressor blades or by excessive gas leakage. Inefficient combustion may be caused by warpage or burning through of a burner or combustor. Inefficient expansion may be caused by damage to or failure of one or more turbine blades or by excessive gas leakage. These factors leading to degradation in jet engine performance may ultimately, if left uncorrected, cause failure of the engine. Accordingly it is desirable that a sensitive engine monitoring system be provided which can detect minute changes in engine performance indicative of mechanical and thermodynamic degradation so that an engine may be overhauled before any serious failure occurs. Jet engines may either be "single spool" or "multiple spool." A single spool engine has one compressor and one turbine mechanically connected, the speed of which is referred to as N. A twin spool engine for example has a low pressure, low speed compressor and turbine mechanically coupled and an independent high pressure, high speed compressor and turbine which are also mechanically coupled. The speed of the high pressure sections is referred to as $N_2$ and the speed of the low pressure sections is referred to as $N_1$. There are many performance parameters which may be measured. For any engine these would include the pressure $P_2$ and the temperature $T_2$ at the outlet of the intake diffuser and the inlet of the compressor. For a single spool engine these would also include the pressure $P_3$ and the temperature $T_3$ at the outlet of the compressor and the inlet of the combustor, the pressure $P_4$ and the temperature $T_4$ at the outlet of the combustor and the inlet of the turbine, and the temperature $T_5$ and the pressure $P_5$ at the outlet of the turbine and the inlet of the exhaust nozzle. For a twin spool engine these would also include the pressure $P_3$ and temperature $T_3$ at the outlet of the low pressure compressor and the inlet of the high pressure compressor, the pressure $P_4$ and the temperature $T_4$ at the outlet of the high pressure compressor and the inlet of the combustor, the pressure $P_5$ and temperature $T_5$ at the outlet of the combustor and the inlet of the high pressure turbine, the temperature $T_6$ and the pressure $P_6$ at the outlet of the high pressure turbine and the inlet of the low pressure turbine, and the pressure $P_7$ and the temperature $T_7$ at the outlet of the low pressure turbine and the inlet of the exhaust nozzle. The temperature at the inlet of the exhaust nozzle is commonly referred to as exhaust gas temperature, $T_5$ for single spool and $T_7$ for twin spool engines. Furthermore, the speed N for single spool and the speeds $N_1$ and $N_2$ for twin spool engines may be measured in addition to the rate of the fuel flow to the combustors. Finally, the usual mechanical quantities including oil pressure, oil temperature, and oil consumption may be measured. Vibration measurements also give an indication of mechanical unbalance due to warpage or failure of rotating parts. There is no single key measurement which will provide all the information desired. However, it is not desirable to increase inordinately the complexity and expense of the monitoring system by measuring every possible parameter. Hereinafter, unless otherwise indicated, this specification is especially directed to twin spool engines.

One object of my invention is to provide a jet engine analyzer in which only a few of the more significant performance parameters need to be measured.

Another object of my invention is to provide a jet engine anlayzer in which engine pressure ratio is the independent variable.

Still another object of my invention is to provide a jet engine analyzer in which the dependent variable parameters of engine performance are reduced to standard conditions of temperature and pressure.

A further object of my invention is to provide a jet engine analyzer in which the reduced dependent variables are compared with functions of the independent variable engine pressure ratio.

A still further object of my invention is to provide a jet engine analyzer employing analog computation by means of logarithmic functions.

In general my invention contemplates the measurement of the pressure $P_2$ and the temperature $T_2$ at the outlet of the intake diffuser and the pressure $P_7$ and the temperature $T_7$ at the inlet of the exhaust nozzle. The engine pressure ratio (PR) is then obtained by determining the quotient $P_7/P_2$. This is the independent variable which is used in function generating apparatus to provide the rate of fuel flow W, the exhaust gas temperature $T_7$, and at least the rotating speed $N_2$ of the high speed, high pressure sections for a jet engine in perfect operating condition. These functions W(PR), $T_7$(PR), and $N_2$(PR), of the engine pressure ratio will be termed the gas generator curves. The gas generator curves of an engine are functions of the throat area of the exhaust nozzle as well. Accordingly the gas generator curves must be corrected if the exhaust nozzle throat area is not maintained constant.

I further measure the actual rate of fuel flow and the actual speed of at least the high pressure, high speed sections. The actual measurements of W, $T_7$, and $N_2$ are then corrected to standard temperature and pressure in accordance with the $P_2$ and $T_2$ measurements and then compared with the normalized gas generator curves to determine the deviation from optimum performance. Diode networks are employed in forming the gas generator curves and also in converting the quantities into logarithms for purposes of computation. These diode networks have a high degree of stability and enable small deviations from optimum performance to be accurately computed.

In the accompanying drawings which form part of the instant specification and which are to be read in conjunction therewith and in which like reference characters are used to indicate like parts in the various views:

FIGURE 3 is a schematic view showing an idealized circuit for obtaining a logarithmic representation of the reduction of $T_2$ to standard temperature.

FIGURE 3a is a schematic view showing a practical configuration of the idealized circuit of FIGURE 3.

FIGURE 4 is a schematic view showing an idealized circuit for obtaining a logarithmic representation of the reduction of $P_2$ to standard pressure.

FIGURE 5 is a graph of the gas generator curves showing the dependent variables W, $T_7$, $N_2$, and $N_1$ as functions of the engine pressure ratio.

FIGURE 6 is a schematic view showing the production of the W(PR) gas generator curve and its reduction to logarithmic form.

FIGURE 7 is a schematic view showing the generation of the $T_7$(PR) gas generator curve and its reduction to logarithmic form.

FIGURE 8 is a schematic view showing the generation of the logarithm of $N_2$(PR).

FIGURE 9 is a schematic view showing one form of precise computation of the deviation in fuel flow.

FIGURE 9a is a schematic view showing an alternative form of precise computation of the deviation in fuel flow.

FIGURE 10 is a schematic vew showing the approximate computation of the deviation in exhaust gas temperature.

FIGURE 11 is a schematic view showing the approximate computation of the deviation in rotative speed.

Figure 1:
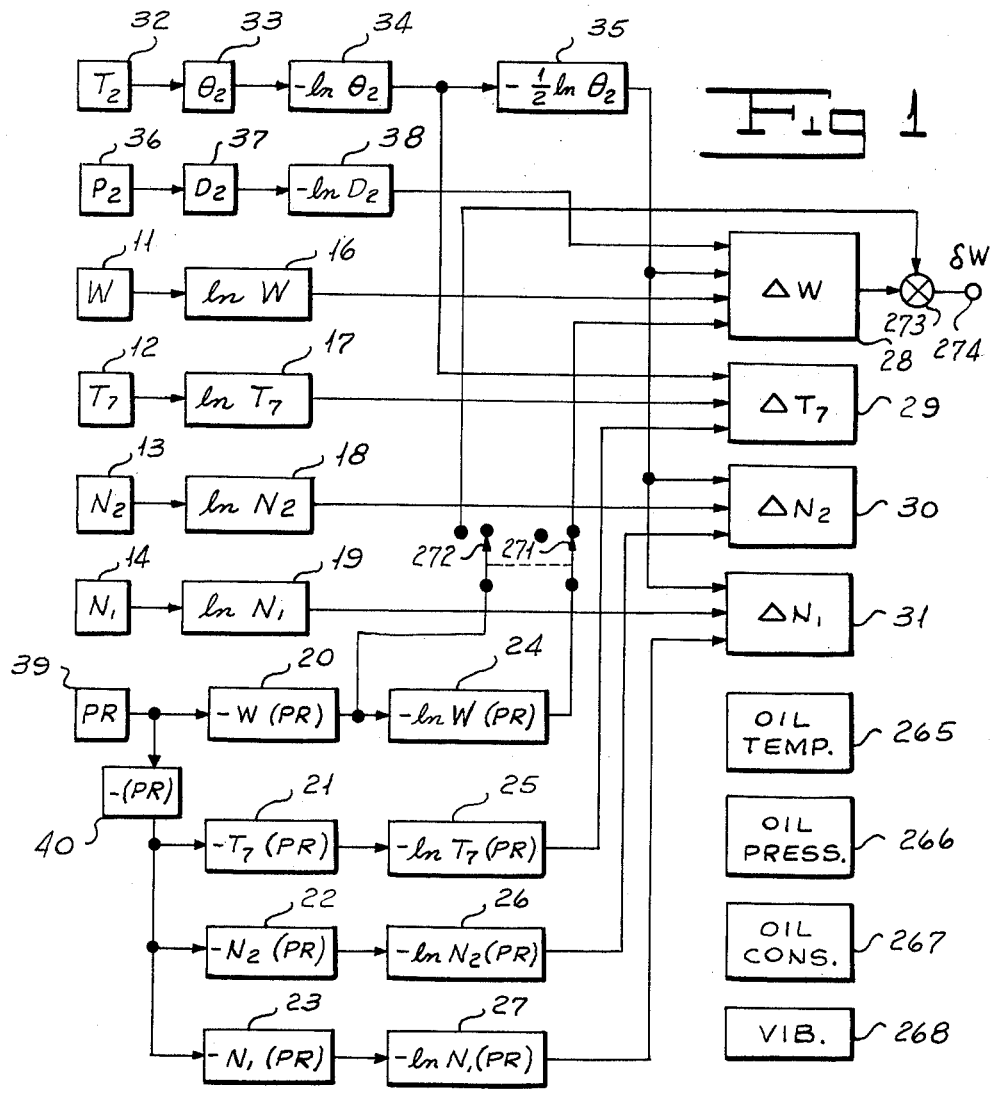
FIGURE 1 is a diagrammatic view of my jet engine analyzer.

Referring more particularly now to FIGURE 1, a temperature probe transducer 32 and a pressure probe transducer 36 may both be positioned in the outlet of the intake diffuser and provide signals in accordance with $T_2$ and $P_2$ respectively. The quantity $P_2$ may be a composite function of total pressure and static pressure; and $T_2$ may be a composite function of total and static temperature. A fuel flow transmitter 11 provides a signal in accordance with W. The exhaust gas temperature $T_7$ is provided by a thermocouple 12 which is positioned in the inlet of the exhaust nozzle. The rotative speeds $N_2$ and $N_1$ of the high pressure, high speed sections and of the low pressure, low speed sections are provided by tachometer generators 13 and 14, respectively. An engine pressure ratio transmitter 39 determines the ratio of pressures $P_7/P_2$ where $P_7$ is the pressure measured at the inlet of the exhaust nozzle. The output signal from the $T_2$ temperature probe 32 is coupled to a circuit 33 which determines the quantity $\theta_2 = T_2/T_0$ where $T_0$ is standard temperature. The output of the $\theta_2$ circuit 33 is coupled to a logarithm generator 34 which provides the quantity $-\ln \theta_2$. The output of logarithm generator 34 is coupled to halving circuit 35 which generates the quantity $-\frac{1}{2}\ln \theta_2$. The output signal of the $P_2$ pressure probe 36 is coupled to a circuit 37 which provides the quantity $D_2 = P_2/P_0$ where $P_0$ is standard pressure. The output of $D_2$ circuit 37 is coupled to a logarithm generator 38 which provides the quantity $-\ln D_2$. The output from the fuel flow transmitter 11 is coupled to a logarithm generator 16 which provides the quantity $\ln W$. The output of the $T_7$ thermocouple 12 is coupled to logarithmic generator 17 which provides the quantity $\ln T_7$. The output of the $N_2$ tachometer 13 is coupled to a logarithmic generator 18 which provides the quantity $\ln N_2$. The output of the $N_1$ tachometer 14 is coupled to a logarithmic generator 19 which provides the quantity $\ln N_1$. The output of the engine pressure ratio transducer 39 is coupled to an inverting amplifier circuit 40 which provides the negative pressure ratio output $-(PR)$. The output of the pressure ratio transducer 39 is also coupled to a gas generator curve network 20 which provides the quantity $-W(PR)$. The output of network 20 is coupled to a logarithmic generator 24 which generates the quantity $-\ln W(PR)$. The output of circuit 40 is coupled to respective gas generator curve networks 21, 22, and 23 which generate the respective quantities $-T_7(PR)$, $-N_2(PR)$, and $-N_1(PR)$. The outputs of networks 21 through 23 are coupled to logarithmic networks 25, 26, and 27, which generate the respective quantities $-\ln T_7(PR)$, $-\ln N_2(PR)$, and $-\ln N_1(PR)$. The outputs of logarithmic generators 35, 38, 16, and 24 are coupled to a circuit 28 which computes the deviation in fuel flow W. The outputs of logarithm generators 34, 17, and 25 are coupled to a circuit 29 which computes the deviation in exhaust gas temperature $T_7$. The outputs of logarithmic generators 35, 18, and 26 are coupled to a circuit 30 which computes the deviation in the rotative speed $N_2$. The outputs of logarithmic generators 35, 19, and 27 are coupled to a circuit 31 which computes the deviation in the rotative speed $N_1$. The customary mechanical quantities comprising oil temperature 265, oil pressure 266, oil consumption 267, and engine vibration 268 may also be measured by appropriate transducers well known to the art. The circuit of FIGURE 1 mechanizes the following equations:

$$\Delta W = \frac{W}{D_2 \sqrt{\theta_2} W(PR)} - 1 = \frac{W}{(P_2/P_0)\sqrt{T_2/T_0} W(PR)} - 1$$

$$\Delta T_7 = \frac{T_7}{\theta_2 T_7(PR)} - 1 = \frac{T_7}{(T_2/T_0) T_7(PR)} - 1$$

$$\Delta N_2 = \frac{N_3}{\sqrt{\theta_2} N_2(PR)} - 1 = \frac{N_2}{\sqrt{T_2/T_0} N_2(PR)} - 1$$

$$\Delta N_1 = \frac{N_1}{\sqrt{\theta_2} N_1(PR)} - 1 = \frac{N_1}{\sqrt{T_2/T_0} N_1(PR)} - 1$$

by the following computations:

$\Delta W = e^{\ln W - \ln D_2 - \frac{1}{2}\ln \theta_2 - \ln W(PR)} - 1$
$\Delta T_7 = e^{\ln T_7 - \ln \theta_2 - \ln T_7(PR)} - 1$
$\Delta N_2 = e^{\ln N_2 - \frac{1}{2}\ln \theta_2 - \ln N_2(PR)} - 1$
$\Delta N_1 = e^{\ln N_1 - \frac{1}{2}\ln \theta_2 - \ln N_1(PR)} - 1$ As will be appreciated by those skilled in the art, multiplication may be effected by the addition of logarithms, division by the subtraction of logarithms, and the extraction of square roots may be effected by the halving of logarithms. Since the logarithmic and exponential functions are inverse, the antilogarithm of a number $y$ is the logarithmic base raised to the power $y$. Thus if $y = \ln x$, then anti $\ln y = e^y = e^{\ln x} = x$.

For a given engine, the dependent variable W may range between 1,000 and 15,000 pounds of fuel per hour. The variable $T_7$ may range between 74° C. and 1231° C. exhaust gas temperature. Both $N_1$ and $N_2$ may range between 35% and 120% of rated speed. In designing the logarithmic function networks 16 through 19 which respond to the dependent variables 11 through 14, certain simplifications result if the variables are always greater than the logarithmic base of $2.7183 = e$. For fuel flow W and exhaust gas temperature $T_7$ the minimum value is always well above $e$. But $N_2$ and $N_1$ are always less than $e$. However, by considering a rotative speed unit to be 1%, then the minimum value of $N_1$ and $N_2$ will be 35 units. Such change of scale factor for $N_1$ and $N_2$ will enable the logarithmic generators of circuits 16 and 17 to be used in circuits 18 and 19.

Figure 2:
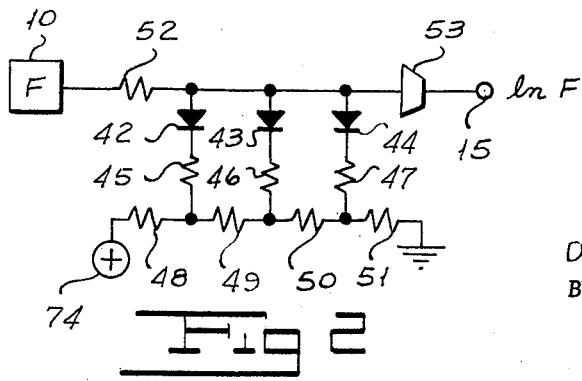
FIGURE 2 is a schematic view showing a diode logarithmic function generator for converting any of the measured parameters W, $T_7$, $N_2$, and $N_1$ into logarithmic form.

Referring now to FIGURE 2, signal source 10 of a dependent variable F is used to indicate the sources 11 through 14 of dependent variables W, $T_7$, $N_2$, and $N_1$. Each of the logarithmic generator networks 16 through 19 comprises an input resistor 52 one terminal of which is driven by source 10 and the other terminal of which is coupled to the input of a unity gain amplifier 53 such as a thermionic cathode follower or a transistor emitter follower the output of which at terminal 15 supplies the desired function $\ln F$. A source of positive reference potential 74 is coupled to ground through serially-connected, voltage-dividing, break-point determining resistors 48, 49, 50, and 51. The input of emitter follower 53 is connected to the anodes of diodes 42, 43 and 44. The cathodes of diodes 42 through 44 are coupled through slope determining resistors 45, 46, and 47 to the junctions of resistors 48 and 49 and of 49 and 50 and of 50 and 51, respectively. The output of source 10 is always positive. For input signals from source 10 ranging between ground and the positive potential equal to that existing at the junction of resistors 50 and 51, each of diodes 42 through 44 is backwardly biased, and resistors 45 through 47 introduces no loading of input resistor 52. Accordingly both the input and output of unity gain amplifier 53 will reproduce input signals from source 10. For signals at the input of amplifier 53 ranging between the positive potentials at the junctions of resistors 50 and 51 and of resistors 49 and 50, diodes 42 and 43 are backwardly biased while diode 44 is forwardly biased. Resistor 47 now introduces a loading effect which reduces the slope of the transfer function between the input signal of source 10 and the output signal at terminal 15. For signals at the input of amplifier 53 ranging between the positive potentials at the junctions of resistors 49 and 50 and of resistors 48 and 49, diode 42 is backwardly biased while diodes 43 and 44 are forwardly biased. Input resistor 52 is now loaded by both resistors 46 and 47, further reducing the slope of the transfer function. For signals at the input of emitter follower 53 greater than the positive potential at the junction of resistors 48 and 49, diode 42 becomes forwardly biased which causes resistor 45 to load input resistor 52, still further decreasing the slope of the transfer function.

Thus the transfer function consists of four straight line sections of successively decreasing slopes separated by three break-points. The initial straight line section, of course, passes through the origin. By using a larger number of break-point resistors in the serial chain and a correspondingly larger number of diodes and slope resistors any degree of accuracy may be achieved. Furthermore, the diodes exhibit a gradual change in resistance in the region of zero volts bias so that the breaks in the resultant curve are not sharp, but instead tend to be rounded, a desirable practical result. Since for the simple logarithm generator of FIGURE 2, the transfer function passes through the origin it is not possible to reproduce the logarithm of numbers less than the logarithmic base $e$. It will be appreciated that a tangent to the curve $y = \ln x$ from the origin $x=0$, $y=0$ intersects the curve at the point of tangency $x=e$, $y=1$. If it were desired to produce the logarithm of a function within a range having a minimum value of unity, then it would be necessary to subtract unity from the input signal 10 so that when the input signal 10 were unity the voltage applied to the input resistor 52 would be zero. In the circuit of FIGURE 2 the voltage existing at the junction of resistors 50 and 51 corresponds to a value which is not less than the logarithmic base $e$.

Referring now to FIGURE 3, I have assumed that transducer 32 provides $T_2$ in degrees Rankine. In the NACA Standard Atmosphere, the sea level standard temperature $T_0$ is 519° R. A negative voltage source 55 scaled to provide the quantity $-T_0 = -519°$ R. and transducer 32 are coupled to an adding circuit 56. The output of adding circuit 56 is coupled to ground through serially-connected, voltage-dividing resistors 57 and 58, having respective values of 518 kilohms and 1 kilohm. The output of the voltage divider at the junction of resistors 57 and 58 is coupled to an adding circuit 61. The output of a source 59 which provides a positive voltage scaled to represent positive unity is also coupled to adding circuit 61. The output of adding circuit 61 at terminal 33 represents $\theta_2 = T_2/T_0$. It will be appreciated that the output of the voltage divider comprising resistors 57 and 58 is $1/519$ of its input from adding circuit 56. Thus $$\frac{T_2 - 519}{519} + 1 = \frac{T_2}{519} = \frac{T_2}{T_0} = \theta_2$$

The nominal value of $\theta_2$ is unity. Since the logarithm of unity is zero, while the logarithm of a number greater than unity is positive and the logarithm of a number less than unity is negative, it is desirable in computing ln $\theta_2$ to shift $\theta_2$ by unity, thus transposing the origin so that when $\theta_2$ is unity the input to the logarithm generator is zero. Accordingly the $\theta_2$ input at terminal 33 is coupled to an adding circuit 62 which also receives from a source 60 a negative voltage which is scaled to represent negative unity. The output of adding circuit 62 is coupled through an input resistor 63 to the anodes of diodes 64, 65, and 66. The source of positive reference potential 74 is coupled to ground through serially-connected, break-point resistors 73, 72, 71 and 70. Slope resistors 67, 68, and 69 couple the cathodes of diodes 64 through 66 to the junction of resistors 70 and 71 and of 71 and 72 and of 72 and 73, respectively. The anodes of diodes 64 through 66 are coupled through a resistor 75 to the input of a high negative gain, stabilized, direct-current, feedback amplifier 76. Source 74 is also coupled to ground through serially-connected, break-point resistors 87, 86, 85 and 84. The output of amplifier 76 is coupled through an input resistor 77 to the anodes of diodes 78, 79, and 80. Slope resistors 81, 82, and 83 connect the cathodes of diodes 78 through 80 to the junctions of resistors 84 and 85 and of 85 and 86 and of 86 and 87, respectively. The anodes of diodes 78 through 80 are coupled through a feedback resistor 88 to the input of amplifier 76. The output of amplifier 76 is coupled to a terminal 34 which provides the quantity $-\ln \theta_2$. The output of amplifier 76 is further connected to ground through serially-connected, voltage-dividing resistors 89 and 90 each having a value of 10K. The junction of resistors 89 and 90 is coupled to the input of a unity gain amplifier 91 at the output of which at terminal 35 provides the quantity $-\frac{1}{2}\ln \theta_2$.

In operation of the circuit of FIGURE 3, when $\theta_2$ is greater than unity, the output of adding circuit 62 is positive. The diode function generator comprising components 63 through 73 produces a transfer function which is concave from below corresponding to the logarithmic function for values greater than unity, since diodes 64 through 66 are forwardly biased. The positive input signal through resistor 75 causes a negative output from amplifier 76. Diodes 78 and 80 in the feedback function generator are all backwardly biased, and the feedback through resistors 77 and 88 is linear. For values of $\theta_2$ less than unity, the output of adding network 62 is negative. Accordingly diodes 64 through 66 are backwardly biased, and the input current of amplifier 76 flowing through resistors 63 and 75 is a linear function. However, for a negative input signal through resistor 75, the output of amplifier 76 is positive. The diode function generator comprising components 77 through 87 is now rendered operative, since diodes 78 through 80 are forwardly biased, providing a feedback transfer function which, as for all diode function generators, is concave from below. However, since this diode function generator is in the feedback path of amplifier 76, its output is concave from above corresponding to the logarithmic function for values less than unity. Thus for values of $\theta_2$ less than unity the positive output transfer function of amplifier 76 consists of straight line sections of successively increasing slopes. The two-to-one voltage dividing action of resistors 89 and 90 causes the $-\ln \theta_2$ output at terminal 34 to provide the desired output of $-\frac{1}{2}\ln \theta_2$ at terminal 35.

Referring now to FIGURE 4, the $P_2$ pressure probe transducer 36 provides an output signal which may be expressed in inches of mercury. In the NACA Standard Atmosphere, the sea level standard pressure $P_0$ is 29.92″ Hg. A negative voltage source 94 scaled to represent $-P_0 = -29.92″$ Hg is coupled to an adding circuit 93 which also receives the signal from pressure transducer 36. The output of adding circuit 93 is coupled to ground through serially-connected, voltage-dividing resistors 95 and 96 having respective values of 28.92K and 1K. The output of the voltage-dividing circuit at the junction of resistors 95 and 96 is coupled to an adding circuit 97 which also receives the positive unity signal from source 59. The output of adding circuit 97 at terminal 37 represents $D_2 = P_2/P_0$. It will be appreciated that the output of the voltage-dividing circuit comprising resistors 95 and 96 is $1/29.92$ of the input from adding circuit 93.
Thus $$\frac{P_2 - 29.92}{29.92} + 1 = \frac{P_2}{29.92} = \frac{P_2}{P_0} = D_2$$

The $D_2$ output at terminal 37 is combined with a negative unity signal from source 60 in adding circuit 98. The output of adding circuit 98 is coupled to the input resistor 99 of a function generator comprising diodes 101 through 103, slope resistors 104 through 106, and serially-connected, break-point resistors 107 through 110 which are coupled between ground and the positive reference source 74. The output of the diode function generator comprising components 99 through 110 is coupled through an input resistor 111 to the input terminal of high negative gain, stabilized, direct-current, feedback amplifier 112. The output of amplifier 112 is coupled to the input resistor 113 of a function generator comprising diodes 114 through 116, slope resistors 117 through 119, and serially-connected break-point resistors 120 through 123 which are coupled between ground and positive reference source 74. The output of the function generator comprising components 113 through 123 is coupled through a feedback resistor 124 to the input of amplifier 112. The output of amplifier 112 is further impressed upon a terminal 38 at which appears the quantity $-\ln D_2$.

The operation of the circuit of FIGURE 4 in analogous to that of FIGURE 3. The nominal value of $D_2$ is unity, where the value of the logarithmic function changes from positive to negative. Source 60 transposes the origin so that the input signal to resistor 99 varies about zero instead of about positive unity. For positive signals at resistor 99 corresponding to values of $D_2$ greater than unity, the input function generator comprising components 99 through 110 produces an input transfer function for amplifier 112 which is concave from below, since diodes 101 through 103 are forwardly biased. The corresponding negative output from amplifier 112 disables the feedback function generator comprising components 113 through 123 since diodes 114 through 116 are backwardly biased. Thus linear feedback current is provided through resistors 113 and 124. For negative signals at input resistor 99 corresponding to values of $D_2$ less than unity, the input function generator comprising components 99 through 110 is disabled, since diodes 101 through 103 are backwardly biased. Accordingly the input current through resistors 99 and 111 is linear. The corresponding positive output from amplifier 112 causes a feedback signal through resistor 124 which is concave from below. However, since the function generator comprising components 113 through 123 is in the feedback path of the amplifier, the transfer function at the output of amplifier 112 is concave from above.

In both FIGURE 3 and FIGURE 4 it will be seen that the schematic provision in FIGURE 1 of the computations in circuit 33 of $\theta_2$ and in circuit 37 of $D_2$ is unnecessary. In FIGURE 3 the output at the junction of voltage-dividing resistors 57 and 58 can be connected directly to input resistor 63; and sources 59 and 60 as well as adding circuits 61 and 62 can be eliminated. In FIGURE 4 the output at the junction of voltage-dividing resistors 95 and 96 can be directly connected to resistor 99; and sources 59 and 60 as well as adding circuits 97 and 98 can be eliminated.

Referring now to FIGURE 3a, I have shown an alternate and preferred form of the circuit of FIGURE 3. A temperature transducer 32a may provide $T_2$ in degrees centigrade. It will be appreciated that $T_0 = 519°$ R. $= 15°$ C. I provide a negative voltage source 55a which is scaled to represent $-T_0 = 15°$ C. Summing resistors 56a and 56b, each having a value of 10K, couple the respective signals from transducer 32a and source 55a to input resistor 63. The remaining portion of the logarithm generator circuitry is the same as in FIGURE 3. Again the output of amplifier 76 at terminal 34 provides the quantity $-\ln \theta_2$. For reasons which will appear hereinafter it is not necessary to employ components 89 through 91 to provide the quantity $-\frac{1}{2}\ln \theta_2$.

It will be seen from FIGURE 3a that it is not necessary to provide the voltage-dividing circuitry comprising resistors 57 and 58 of FIGURE 3 since this merely represents a change of scale which may be accounted for either in the logarithm generator circuitry itself or in the computation of parameter deviation in circuits 28 through 31. It is merely desirable that the signal to the input resistor 63 of the logarithm generator be zero when $T_2 = T_0$. As will be appreciated by those ordinarily skilled in the art, the circuit of FIGURE 4 may be similarly reduced in the manner shown in FIGURE 3a.

Referring now to FIGURE 5 I have shown a graph of representative gas generator curves for a turbo-jet engine. The various functions F(PR) are plotted in linear scales with suppressed zeros against the engine pressure ratio $(PR) = P_7/P_2$. It will be noted that $N_2(PR)$, $N_1(PR)$, and $T_7(PR)$ are shown as concave from below, while W(PR) is shown as concave from above. While these are the usual characteristics of the gas generator curves, there will be differences between engines of various types; and $T_7(PR)$ especially may exhibit a concavity from above for pressure ratios of 2.1 or less. In FIGURES 6, 7, and 8, I have assumed that the gas generator curves of FIGURE 5 will apply.

Referring now to FIGURE 6, the engine pressure ratio transducer 39 is coupled through a resistor 126 to the input of a high negative gain, stabilized, direct-current, feedback amplifier 127 which is provided with a feedback resistor 128. The output of amplifier 127 is coupled to a terminal 40 at which appears the quantity $-(PR)$. Thus amplifier 127 serves merely as an inverter. The output of pressure ratio transducer 39 is coupled through a resistor 129 to the input of a high negative gain, stabilized, direct-current, feedback amplifier 130. The output of amplifier 130 is coupled to the input resistor 131 of a gas function generator comprising diodes 132 through 134, slope resistors 135 through 137, and serially-connected, break-point resistors 138 through 41, which are coupled between a source 143 of negative reference potential and ground. The output of the gas function generator comprising components 131 through 141 is connected through a feedback resistor 142 to the input of amplifier 130. The output of amplifier 130 at terminal 20 represents the quantity $-W(PR)$. Terminal 20 is connected to the input resistor 144 of a logarithmic function generator comprising diodes 145 through 147, slope resistors 148 through 150, and serially-connected, break-point resistors 151 through 154, which are coupled between the negative reference source 143 and ground. The output of the logarithmic function generator comprising components 144 through 154 is coupled to the input of a unity gain amplifier 155, the output of which at terminal 24 represents $-\ln W(PR)$. It will be noted that the cathodes of diodes 132 through 134 are connected in common and that the cathodes of diodes 145 through 147 are likewise connected in common. This reversed polarity connection of the diodes in FIGURE 6 agrees with the negative reference potential provided by source 143. In FIGURES 2, 3, 3a, and 4, the anodes of the diodes are connected in common in agreement with the positive reference potential of source 74.

In operation of the circuit of FIGURE 6, the gas function generator, comprising components 131 through 141, in the feedback path of amplifier 130 provides a feedback transfer function which is concave from below. Thus the transfer function between transducer 39 and terminal 20 is concave from above, which agrees with the curve W(PR) of FIGURE 5. The function generator comprising components 144 through 154 provides a transfer function which is concave from below in agreement with the logarithmic function for converting $-W(PR)$ to $-\ln W(PR)$.

Referring now to FIGURE 7 the negative pressure ratio signal at terminal 40 is coupled to the input resistor 157 of a gas function generator comprising diodes 158 through 160, slope resistors 161 through 163, and serially-connected, break-point resistors 164 through 167 which are coupled between ground and negative reference source 143. The output of the gas function generator comprising components 157 through 167 is coupled to the input of a unity gain amplifier 168, the output of which at terminal 21 represents $-T_7(PR)$. Terminal 21 is connected to the input resistor 169 of a logarithmic function generator comprising diodes 170 through 172, slope resistors 173 through 175, and serially-connected, break-point resistors 176 through 179 coupled between the negative reference source 143 and ground. The output of the logarithmic function generator comprising components 169 through 179 is impressed on the input of a unity gain amplifier 180 the output of which at terminal 25 represents $-\ln T_7(PR)$. Again, it will be noted that the cathodes of gas generator diodes 158 through 160 are connected in common and the cathodes of logarithm generator diodes 170 through 172 are likewise connected in common in agreement with the polarity of negative reference source 143.

The gas generator curve $T_7(PR)$ of FIGURE 5 is concave from below; and the gas function generator comprising components 157 through 167 may be of the simple form shown. Since both the gas and the logarithmic function generators of FIGURE 7 provide transfer functions which are concave from below, it is possible, and indeed preferable, to produce directly the quantity $-\ln T_7(PR)$ by a single composite function generator responsive to the negative pressure ratio signal 40. In FIGURE 7 the schematic representation of the separate components 21 and 25 of FIGURE 1 has, however, been followed.

Referring now to FIGURE 8, the negative pressure ratio signal at terminal 40 is impressed on the input resistor 182 of a composite function generator comprising diodes 183 through 186, slope resistors 187 through 190, and serially-coupled, break-point resistors 191 through 195 which are connected between the negative reference source 143 and ground. The output of the composite function generator comprising components 182 through 195 is impressed upon the input of an emitter follower 196 the output of which at terminal 26 represents $-\ln N_2(PR)$. It will be noted that the cathodes of diodes 183 through 186 are connected in common, which agrees with the polarity of the negative reference source 143.

The composite function generator of FIGURE 8 directly provides the desired function $-\ln N_2(PR)$ in response to the negative pressure ratio signal at terminal 40. This is feasible since as poined out in conjunction with FIGURE 7 the gas generator curves $T_7(PR)$, $N_2(PR)$, N, (PR) are concave from below; and the logarithmic function is concave from below as well. Thus the composite function generator shown in FIGURE 8 is to be preferred rather than the use of two function generators as in FIGURE 7 where the gas generator curves are concave from below.

The composite function generator for providing $-\ln N_1(PR)$ directly in response to the negative pressure ratio signal at terminal 40 has not been shown, since the circuitry is similar to that shown in FIGURE 8.

In FIGURE 6 the gas generator function is concave from above while the logarithmic function is concave from below. Depending upon the relative shapes of the gas and logarithmic function curves, the overall transfer function between the pressure ratio transducer 39 and the $-\ln W(PR)$ output at terminal 24 may be entirely concave from below or may be either entirely or partially concave from above. As will be appreciated by those ordinarily skilled in the art, if the overall transfer function between transducer 39 and terminal 24 is entirely concave from below, then such transfer function may be produced by a composite generator of the type shown in FIGURE 8. In such event the composite generator should be driven by the negative pressure ratio signal at terminal 40, since the need for negative gain amplifier 130 and the provision of a function generator in its feedback path would no longer be necessary to provide a transfer function concave from above.

Referring now to FIGURE 9 the quantities ln W at terminal 16, $-\ln D_2$ at terminal 38, $-\tfrac{1}{2}\ln \theta_2$ at terminal 35, and $-\ln W(PR)$ at terminal 24 are coupled through respective summing resistors 198, 199, 200, and 201 to the input of a high negative gain, stabilized, direct-current amplifier 202. Each of resistors 198 through 201 may have a value of one megohm. The output of amplifier 202 is connected to the input of an auxiliary negative gain, direct-current amplifier 203. Amplifier 203 may have only one stage, may have a low absolute gain even less than unity, and need not be stabilized, since it serves merely as a direct-current inverting amplifier so that the overall gain of amplifiers 202 and 203 is positive. The output of amplifier 203 at terminal 27 provides a quantity which is exactly equal to the deviation in fuel flow ΔW. The output of amplifier 203 is connected to the input resistor 204 of a logarithmic function generator comprising diodes 205 and 206, slope resistors 207 and 208, and break-point resistors 209, 210, and 211 which are serially connected between ground and the positive reference source 74. The output of the logarithm generator comprising components 205 through 211 at the anodes of the diodes is connected through a resistor 212 to the input of a high negative gain, stabilized, direct-current amplifier 213. The output of amplifier 213 is connected through resistor 214 to the input of amplifier 202 and is further connected to the input resistor 215 of a logarithmic function generator comprising diodes 216 and 217, slope resistors 218 and 219, and break-point resistors 220, 221 and 222 which are serially connected between ground and the positive reference source 74. The output of the logarithm generator comprising components 215 through 222 at the anodes of the diodes is connected through a feedback resistor 223 to the input of amplifier 213.

In operation of the circuit of FIGURE 9, when the positive input at terminal 16 is equal to the sum of the negative inputs at terminals 38, 35 and 24, then $\ln(1+\Delta W)=0$. Since antiln $0=e^0=1=(1+\Delta W)$, then $\Delta W=0$. Hence there is no derivation ΔW in fuel flow. The purpose of components 204 through 222 is to provide a current through resistor 214 which is proportional to $\ln(1+\Delta W)$. It will be noted that the current through resistor 214 is proportional to $\ln(1+\Delta W)$ whereas the signal to resistor 204 is only ΔW. The reason for this apparent shift in coordinate by unity will be understood by again referring to FIGURES 3 and 4. It will be recalled that when the signals $\theta_2$ at terminal 33 and $D_2$ at terminal 37 are unity then the signals $\Delta\theta_2$ at resistor 63 and $\Delta D_2$ at resistor 99 are zero. This equivalence will be more evident when it is noted that the quantity $(1+\Delta W)$ may be obtained merely by inserting an adding network between the output of amplifier 304 and resistor 204, which adding network receives a signal from the negative unity source 60. In such event the output of amplifier 203 would represents $(1+\Delta W)$. When the positive signal at terminal 16 exceeds the sum of the negative signals at terminals 38, 35, and 24, then $\ln(1+\Delta W)$ is greater than zero, producing a positive output at terminal 28. For positive signals at terminal 28, diodes 205 and 206 may be forwardly biased and the output of amplifier 213 is negative, disabling diodes 216 and 217. The overall feedback transfer function between resistor 204 and resistor 214 is concave from below, producing an antilogarithmic output at terminal 28 which is concave from above, since components 204 through 222 are in the feedback path of amplifiers 202 and 203. When the positive signal at terminal 16 is less than the sum of the negative signals at terminals 38, 35 and 24, then $\ln(1+\Delta W)$ is less than zero, producing a negative output at terminal 28. For negative signals at terminal 28, diodes 205 and 206 are backwardly biased and thus disabled; and the output of amplifier 213 is positive. The positive output of amplifier 213 may forwardly bias diodes 216 and 217. Components 215 through 222 produce a feedback transfer function for amplifier 213 which, as for any diode function generator, is concave from below. However, the transfer function of amplifier 213 and consequently the over-all feedback transfer function between resistor 204 and resistor 214 is concave from above. Since the feedback transfer function of amplifiers 202 and 203 is thus concave from above, the antilogarithmic output at terminal 28 is concave from below.

Referring now to FIGURE 9a, the quantities ln W at terminal 16, $-\ln D_2$ at terminal 38, $-\ln \theta_2$ at terminal 34, and $-\ln W(PR)$ at terminal 24 are coupled through respective summing resistors 198, 199, 200a, and 201 to the input of a high negative gain, stabilized, direct-current summing amplifier 225 which is provided with a feedback resistor 226. Resistor 200a may have a value of 2M. The output of summing amplifier 225 at terminal 28a is approximately equal to $-\Delta W$. Terminal 28a is connected to the input resistor 227 of an antilogarithm generator comprising diodes 228 and 229, slope resistors 230 and 231, and break-point resistors 232 through 234 which are serially connected between ground and the positive reference source 74. The output of the antilogarithm generator comprising components 227 through 234, at the anodes of the diodes, is coupled through a resistor 235 to the input of a high negative gain, stabilized, direct-current amplifier 236, the output of which at terminal 28 is exactly equal to $\Delta W$. The output of amplifier 236 is coupled to the input resistor 237 of an antilogarithm generator comprising diodes 238 and 239, slope resistors 240 and 241, and break-point resistors 242 through 244, which are serially connected between ground and the positive reference source 74. The output of the antilogarithm generator comprising components 237 through 244 at the anodes of the diodes is coupled through a feedback resistor 245 to the input of amplifier 236.

In operation of the circuit of FIGURE 9a, when the positive current through resistor 198 is equal to the sum of the negative currents through resistors 199, 200a and 201, then $\ln(1+\Delta W)=0$. It will be noted in FIGURE 9a that I provide a $-\ln \theta_2$ signal at terminal 34 rather than, as in FIGURE 9, the $-\frac{1}{2}\ln \theta_2$ signal at terminal 35. It will further be noted that resistor 200a of FIGURE 9a has a value of 2M, whereas in FIGURE 9 resistor 200 has a value of 1M. Since the current through the resistor is equal to the voltage impressed divided by its resistance value, it will be seen that the input current through resistor 200 of FIGURE 9 is the same as that through 200a of FIGURE 9a. This is the reason in FIGURE 3a for providing only the $-\ln \theta_2$ output at terminal 34 and eliminating the $-\frac{1}{2}\ln \theta_2$ output at terminal 35 of FIGURE 3. If $\ln(1+\Delta W)=0$, then antiln $0=e^0=1=(1+\Delta W)$; and $\Delta W+0$. Hence there is no derivative $\Delta W$ in fuel flow. The output at terminal 28a, as previously pointed out, is approximately equal to $-\Delta W$ but it is also exactly equal to $-\ln(1+\Delta W)$. Components 227 through 245 serve as an antilogarithm generator which converts the logarithmic output at terminal 28a into an output at terminal 28 which is exactly equal to $\Delta W$. Accordingly, the antilogarithm generator comprising components 227 through 245 provides an exponential function. This exponential function is however displaced by unity so that when the input logarithm at terminal 28a is 0, the output at terminal 28, which should represent $e^0=1$, is instead zero. This shift in coordinate by unity for exponential function generator is analogous to the shift by unity in the logarithm generators of FIGURES 3, 3a, 4 and 9. When the positive current through resistor 198 exceeds the sum of the negative currents through resistors 199, 200a, and 201, then a negative output appears at terminal 28a of summing amplifier 225. For negative signals at terminal 28a, diodes 228 and 229 are backwardly biased and thus disabled; and amplifier 236 provides a positive output at terminal 28. For positive signals at terminal 28, diodes 238 and 239 may be forwardly biased, producing a feedback transfer function for amplifier 236 which is concave from below. Accordingly, the transfer function between terminal 28a and terminal 28 is concave from above in accordance with the exponential function in producing the antilogarithm of numbers greater than zero. When the positive current through resistor 198 is less than the sum of the negative currents through resistors 199, 200a, and 201, the output of summing amplifier 225 at terminal 28a is positive. For positive signals at terminal 28a diodes 228 and 229 may be forwardly biased; and the output of amplifier 236 at terminal 28 is negative. For negative signals at terminal 28, diodes 238 and 239 are backwardly biased and thus disabled, producing a linear feedback current for amplifier 236 through resistors 237 and 245. Accordingly the over-all transfer function between terminal 28a and 28 is concave from below in accordance with the exponential function in producing the antilogarithm of numbers less than zero.

The formulas for the series expansions of the logarithmic and exponential functions offer some insight.

$$\ln(1+x) = x - \frac{x^2}{2} + \frac{x^3}{3} - \frac{x^4}{4} + \cdots$$

$$\text{antiln } x = e^x = 1 + x + \frac{x^2}{2} + \frac{x^3}{6} + \frac{x^4}{24} + \cdots$$

From the foregoing it will be seen that if $x$ is small compared with unity, then $$\ln(1+x) \doteq x$$
$$e^x - 1 \doteq x$$

The maximum deviation in any of the engine performance parameters will not ordinarily exceed 3% so long as the engine is operating normally. It will be seen that even if the deviation is 5%, the error introduced by a linear approximation to the logarithmic and exponential functions will not exceed 0.1%. The logarithm generator of FIGURE 9 and the exponential generator of FIGURE 9a may provide at least the $x^2/2$ term of the logarithmic and exponential series expansions.

Since the function generators of FIGURE 9 and 9a contribute only residual correction terms to the linear approximations, they may be of the simple type shown comprising but one or two break-points and correspondingly providing two or three straight line sections of varying slopes for both positive and negative values.

Referring now to FIGURE 10, the quantities ln $T_7$ at terminal 17, $-\ln \theta_2$ at terminal 34, and $-\ln T_7(PR)$ at terminal 25 are coupled through respective summing resistors 247, 248, and 249 to the input of a high negative gain, stabilized, direct-current summing amplifier 250 which is provided with a feedback resistor 251. The output of summing amplifier 250 at terminal 29a is approximately equal to $-\Delta T_7$. Terminal 29a is coupled through a resistor 252 to the input of a high negative gain, stabilized, direct-current amplifier 253 which is provided with a feedback resistor 254. The output of amplifier 253 at terminal 29 provides a quantity which is approximately equal to $\Delta T_7$.

The operation of the circuit of FIGURE 10 is analogous to that of FIGURE 9a. It will be noted that the $-\ln \theta_2$ input at terminal 34 is impressed upon resistor 248 which has a value of 1 megohm. This produces the subtraction of ln $\theta_2$ and represents division by $\theta_2$. Components 252 through 254 serve merely as an inverting amplifier so that the approximate $\Delta T_7$ signal at terminal 29 is of positive polarity instead of negative polarity as at terminal 29a. If the negative polarity approximation —$\Delta T_7$ at terminal 29a will suffice, then components 252 through 254 may be eliminated.

Referring now to FIGURE 11 the quantities ln $N_2$ at terminal 18, —ln $\theta_2$ at terminal 34, and —ln $N_2(PR)$ at terminal 26 are coupled through respective summing resistors 256, 247a, and 258 to the input of a high negative gain, stabilized, direct-current summing amplifier 259 which is provided with a feedback resistor 260. The output of amplifier 259 at terminal 30a is approximately equal to $\Delta N_2$. Resistors 256 and 258 may each have values of 1M while resistor 257a should have a value of 2M. Terminal 30a is coupled through a resistor 261 to the input of a high negative gain, stabilized, direct-current amplifier 262 which is provided with a feedback resistor 263. The output of amplifier 262 at terminal 30 is a positive polarity approximation to $\Delta N_2$. The operation of the circuit of FIGURE 11 is analogous to that of FIGURES 9a and 10. It will be noted that summing resistor 257a for the —ln $\theta_2$ input at terminal 34 has a value of 2M. Thus the current through resistor 257a of FIGURE 11 is only half that through resistor 248 of FIGURE 10 and is equal to that through resistor 200a of FIGURE 9a or through resistor 200 of FIGURE 9. The subtraction of half ln $\theta_2$ represents division by $\sqrt{\theta_2}$. Again the provision of inverting amplifier components 261 through 263 is necessary only if a positive polarity output $\Delta N_2$ is required.

It will be appreciated that the circuits of FIGURES 10 and 11 may provide quantities exactly equal to $\Delta T_7$ and $\Delta N_2$ by employing either a logarithm generator as in FIGURE 9 or an antilogarithm, exponential generator as in FIGURE 9a. Furthermore, circuit 31 for providing a quantity approximately equal to $\Delta N_1$ has not been shown, since it will take the same form as FIGURE 11. While the computation of $\Delta N_1$ in circuit 31 offers some usefulness, the indications $\Delta N_1$ are relatively minor compared with the more sensitive indications $\Delta N_2$.

While the measurement of engine pressure ratio $P_7/P_2$ for twin spool (or $P_5/P_2$ for single spool) engines is preferable, certain of the older engines have no provision for the measurement of the pressure $P_7$ for twin spool (or $P_5$ for single spool) engines at the outlet of the turbine and the inlet of the exhaust nozzle. In such event the compressor pressure ratio $P_4/P_2$ for twin spool (or $P_3/P_2$ for single spool) engines would be used in place of the engine pressure ratio; and the gas generator curves may provide $N_1$ and $N_2$ (or $N$), $W$, and $T_7$ (or $T_5$) as functions of the compressor pressure ratio $P_4/P_2$ (or $P_3/P_2$). My jet engine analyzer may also be used for monitoring the newer "by-pass" or "fan" engines.

While I have thus far shown the computation of the normalized deviations in performance parameters, that is the deviations from a nominal ratio of unity, it will be appreciated that the actual deviations in the parameters may be provided by mechanizing the following equations.

$$\delta W = \frac{W}{D_2\sqrt{\theta_2}} - W(PR) = \frac{W}{\frac{P_2}{P_0}\sqrt{\frac{T_2}{T_0}}} - W(PR)$$

$$\delta T_7 = \frac{T_7}{\theta_2} - T_7(PR) = \frac{T_7}{T_2/T_0} - T_7(PR)$$

$$\delta N_2 = \frac{N_2}{\sqrt{\theta_2}} - N_2(PR) = \frac{N_2}{\sqrt{T_2/T_0}} - N_2(PR)$$

$$\delta N_1 = \frac{N_1}{\sqrt{\theta_2}} - N_1(PR) = \frac{N_1}{\sqrt{T_2/T_0}} - N_1(PR)$$

by the following computations $$\delta W = e^{\ln W - \ln D_2 - \frac{1}{2}\ln \theta_2} - W(PR)$$
$$\delta T_7 = e^{\ln T_7 - \ln \theta_2} - T_7(PR)$$
$$\delta N_2 = e^{\ln N_2 - \frac{1}{2}\ln \theta_2} - N_2(PR)$$
$$\delta N_1 = e^{\ln N_1 - \frac{1}{2}\ln \theta_2} - N_1(PR)$$

Thus to compute the actual deviation in FIGURE 1, logarithm generators 24 through 27 may be eliminated, so that only the outputs of circuits 34, 35, 38 and 16 through 19 are coupled to circuits 28 through 31. Since the outputs of circuits 28 through 31 will be much greater than unity, either a logarithmic or exponential circuit as in FIGURE 9 or 9a will be required; and a larger number of break-points may also be required. Since the outputs of circuits 28 through 31 will be only positive, components 216 through 222 of FIGURE 9 may be eliminated; and components 228 through 234 of FIGURE 9a may be eliminated. The outputs of circuits 28 through 31 will now represent the measured values of $W$, $T_7$, $N_2$, and $N_1$ corrected for pressure $D_2$ and for temperature $\theta_2$. The outputs of circuits 28 through 31 may be added to the respective outputs of gas function generators 20 through 23 to provide the actual deviations in the performance parameters.

Referring now to FIGURE 1, there is also shown a circuit for computing the actual deviation $\delta W$ in fuel flow. Upon simultaneous actuation of ganged switches 271 and 272, logarithm generator 24 is disconnected from circuit 28; and the output gas function generator 20 is connected to one input of a resistive adding circuit 273. The output of circuit 28 is coupled to the other input of adder 273 which provides at terminal 274 the output $\delta W$. It will be appreciated that the actual deviations in the other parameters may be computed in a similar manner. It is to be again emphasized that circuits 29 through 31 must employ wide range logarithmic or exponential function generators (similar to FIGURES 9 and 9a) which however need respond only to positive signals. It will be appreciated that because the outputs of circuits are much greater than unity, a linear approximation will not suffice.

It will be seen that I have accomplished the objects of my invention. In my jet engine analyzer only the fuel flow, the exhaust gas temperature, and the rotational velocity of the high-speed, high-pressure compressor-turbine sections need be measured, in addition to one pressure-ratio measurement. Preferably this pressure-ratio measurement is of the engine pressure ratio, however the compressor pressure ratio will suffice where the exhaust gas pressure is not available. The pressure ratio measurement is used as the independent variable in providing the gas generator functions of the dependent variables. The dependent variables are corrected for temperature $\theta_2$ and pressure $D_2$, and thereby reduced to standard conditions. The reduced, corrected variables are then compared with the gas generator functions to determine the deviation in each of the dependent variables. In one form of my invention, I compute a ratio to determine the normalized deviation from unity. In another form of my invention, I compute a difference to determine the actual deviation. In my jet engine analyzer analog computation is employed and is effected by means of logarithmic functions.

It will be understood that certain features and subcombinations are of utility and may be employed without reference to other features and subcombinations. This is contemplated by and is within the scope of my claims. It is further obvious that various changes in details may be made within the scope of my claims without departing from the spirit of my invention. It is therefore to be understood that my invention is not to be limited to the specific details shown and described.

Having thus described my invention, what I claim is:

1. An analyzer for a jet engine having an intake diffuser outlet including in combination means for providing a first signal in accord with the ratio of two engine pressures one of which is at the outlet of the intake diffuser and the other of which is downstream of said outlet, means responsive to the first signal for providing a second signal in accord with the expected value of an engine parameter which varies as a function of said pressure ratio for an engine in normal condition operating with a standard temperature at the outlet of the intake diffuser, means for providing a third signal in accord with the actual value of said parameter, means responsive to the temperature at the outlet of the intake diffuser for correcting the third signal to said standard temperature thereby to provide a fourth signal, and means responsive to the second and fourth signals for determining a deviation in said parameter.

2. An analyzer as in claim 1 for a jet engine having an exhaust nozzle inlet in which the other pressure is at the inlet of the exhaust nozzle.

3. An analyzer as in claim 1 for a jet engine having a combustor inlet in which the other pressure is at the inlet of the combustor.

4. A jet engine analyzer as in claim 1 in which the parameter is exhaust gas temperature.

5. A jet engine analyzer as in claim 1 in which the parameter is fuel flow W, in which the fourth signal means comprises means for computing the quantity $W/(D\sqrt{\theta})$, where $\theta$ is the ratio of diffuser outlet temperature to said standard temperature and where D is the ratio of diffuser outlet pressure to a standard pressure, and in which the second signal is provided in accord with the nominal value of fuel flow for an engine in normal condition operating with said standard pressure at the outlet of the intake diffuser.

6. A jet engine analyzer as in claim 1 in which the parameter is exhaust gas temperature T and in which the fourth signal means comprises means for computing the quantity $T/\theta$, where $\theta$ is the ratio of diffuser outlet temperature to said standard temperature.

7. A jet engine analyzer as in claim 1 in which the parameter is rotational velocity N and in which the fourth signal means comprises means for computing the quantity $N/\sqrt{\theta}$, where $\theta$ is the ratio of diffuser outlet temperature to said standard temperature.

8. A jet engine analyzer as in claim 1 in which the deviation means comprises means for computing the difference between the second and fourth signals.

9. A jet engine analyzer as in claim 1 in which the deviation means comprises means for computing the ratio of the second and fourth signals.

10. A jet engine analyzer as in claim 1 in which the deviation means comprises means for computing a quantity which is equal to the difference between the ratio of the second and fourth signals and unity.

11. A jet engine analyzer as in claim 1 in which the second signal means comprises a diode function generator.

12. A jet engine analyzer as in claim 1 in which the deviation means comprises a logarithmic function generator.

13. A jet engine analyzer as in claim 1 in which the parameter is fuel flow.

14. A jet engine analyzer as in claim 1 in which the parameter is rotational velocity.

15. An analyzer for a jet engine having an intake diffuser outlet including in combination means for providing a voltage in accord with the ratio (PR) of two engine pressures one of which is at the outlet of the intake diffuser and the other of which is downstream of said outlet, means responsive to said voltage for providing a first signal in accord with the expected value of fuel flow W(PR) and a second signal in accord with the expected value of exhaust gas temperature T(PR) and a third signal in accord with the expected value of rotational velocity N(PR) for an engine in normal condition operating with a standard pressure and a standard temperature at the outlet of the intake diffuser, means for providing a fourth signal in accord with the actual value of fuel flow W, means for providing a fifth signal in accord with the actual value of exhaust gas temperature T, means for providing a sixth signal in accord with the actual value of rotational velocity N, means for providing a seventh signal in accord with the ratio $\theta$ of the temperature at the outlet of the intake diffuser to said standard temperature, means for providing an eighth signal in accord with the ratio D of the pressure at the outlet of the intake diffuser to said standard pressure, and means responsive to said eight signals for mechanizing one of the equations of each of the following three pairs of equations:

(1a) $$\Delta W = \frac{W}{D\sqrt{\theta}W(PR)} - 1$$

(1b) $$\delta W = W/(D\sqrt{\theta}) - W(PR)$$

(2a) $$\Delta T = \frac{T}{\theta T(PR)} - 1$$

(2b) $$\delta T = T/\theta - T(PR)$$

(3a) $$\Delta N = \frac{N}{\sqrt{\theta}N(PR)} - 1$$

(3b) $$\delta N = N/\sqrt{\theta} - N(PR)$$

where $\Delta$ represents normalized deviation relative to unity and where $\delta$ represents actual deviation.

16. A jet engine analyzer as in claim 15 in which the mechanizing means comprises means for performing the operations represented respectively by the following corresponding equations:

(1a) $\Delta W = b^{\text{lbW}-\text{lbD}-\frac{1}{2}\text{lb}\theta-\text{lbW(PR)}} - 1$
(1b) $\delta W = b^{\text{lbW}-\text{lbD}-\frac{1}{2}\text{lb}\theta} - W(PR)$
(2a) $\Delta T = b^{\text{lbT}-\text{lb}\theta-\text{lbT(PR)}} - 1$
(2b) $\delta T = b^{\text{lbT}-\text{lb}\theta} - T(PR)$
(3a) $\Delta N = b^{\text{lbN}-\frac{1}{2}\text{ln}\theta-\text{lbN(PR)}} - 1$
(3b) $\delta N = b^{\text{lbN}-\frac{1}{2}\text{lb}\theta} - N(PR)$ where b represents a logarithmic base and where lb represents the logarithm to such base.

17. An analyzer as in claim 15 for a jet engine having an exhaust nozzle inlet in which the other pressure is at the inlet of the exhaust nozzle.

18. An analyzer as in claim 15 for a jet engine having a combustor inlet in which the other pressure is at the inlet of the combustor.

19. An analyzer as in claim 15 for a jet engine having a low-pressure and a high-pressure spool in which the third signal N(PR) and the sixth signal N(PR) represent respectively the expected and the actual rotational velocity of the high-pressure spool.

20. A jet engine analyzer as in claim 15 in which said standard pressure is 29.92 inches of mercury and in which said standard temperature is 519° R.=15° C.

21. A jet engine analyzer as in claim 15 in which the mechanizing means includes a logarithmic function generator.

22. A jet engine analyzer as in claim 15 in which the mechanizing means and the first and second and third signal means each includes a diode function generator.

23. An analyzer for a jet engine having an intake diffuser outlet including in combination means for providing a first signal in accord with the pressure at the outlet of the intake diffuser, means for providing a second signal in accord with a standard pressure, means for algebraically combining the first and second signals to provide a third signal which is zero when the diffuser pressure is equal to said standard pressure, a first and a second logarithmic function generator, a high negative gain direct-current amplifier having an input and providing an output, means including the first logarithmic function generator for coupling the third signal to the input of the amplifier, and means including the second logarithmic function generator for coupling the output of the amplifier to the input thereof.

24. An analyzer for a jet engine having an intake diffuser outlet including in combination means for providing a first signal as a function of the expected value of an engine parameter for an engine in normal condition operating with a standard temperature at the outlet of the intake diffuser, means for providing a second signal in accord with a logarithm of the ratio of the temperature at the outlet of the intake diffuser to said standard temperature, means for providing a third signal in accord with a logarithm of the actual value of said engine parameter, and means responsive to the three signals for determining a deviation in said parameter.

25. A jet engine analyzer as in claim 24 in which the deviation means comprises high positive gain direct-current amplifying means having an input and providing an output, means coupling the second and third signals to the input of the positive gain amplifier, a high negative gain direct-current amplifier having an input and providing an output, a first and a second logarithmic function generator, means including the first logarithmic function generator for coupling the output of the positive gain amplifier to the input of the negative gain amplifier, means including the second logarithmic function generator for coupling the output of the negative gain amplifier to the input thereof, and means coupling the output of the negative gain amplifier to the input of the positive gain amplifier.

26. A jet engine analyzer as in claim 24 in which the deviation means comprises an algebraic combination device having an input and providing an output, means coupling the second and third signals to the input of the algebraic combination device, a high negative gain direct-current amplifier having an input and providing an output, a first and a second antilogarithmic exponential function generator, means including the first exponential function generator for coupling the output of the algebraic combination device to the input of the amplifier, and means including the second exponential function generator for coupling the output of the amplifier to the input thereof.

27. A jet engine analyzer as in claim 24 in which the first signal means provides a signal in accord with a logarithm of the expected value of said parameter and in which the deviation means comprises means for algebraically combining said three signals.

28. An analyzer for a jet engine having an intake diffuser outlet and a low-pressure and a high-pressure spool including in combination means for providing a first signal in accord with the ratio of two engine pressures one of which is at said outlet and the other of which is downstream thereof, means responsive to the first signal for providing a second signal in accord with the expected rotational velocity of the high-pressure spool for an engine in normal condition operating with a standard temperature at said outlet, means for providing a third signal in accord with the actual rotational velocity of the high-pressure spool, means responsive to the temperature at said outlet for correcting the third signal to said standard temperature thereby to provide a fourth signal, and means responsive to the second and fourth signals for determining a deviation in the rotational velocity of the high-pressure spool.

29. An analyzer for a jet engine having an intake diffuser outlet including in combination means for providing a first signal in accord with the temperature at the outlet of the intake diffuser, means for providing a second signal in accord with a standard temperature, means for algebraically combining the first and second signals to provide a third signal which is zero when the diffuser temperature is equal to said standard temperature, a first and a second logarithmic function generator, a high negative gain direct-current amplifier having an input and providing an output, means including the first logarithmic function generator for coupling the third signal to the input of the amplifier, and means including the second logarithmic function generator for coupling the output of the amplifier to the input thereof.

References Cited by the Examiner
UNITED STATES PATENTS 2,792,685 5/1957 Constantino et al.
3,033,042 5/1962 Clement et al. _____ 73—116 X RICHARD C. QUEISSER, *Primary Examiner.*

DAVID SCHONBERG, *Examiner.*